United States Patent [19]

Bühler

[11] Patent Number: 4,468,781
[45] Date of Patent: Aug. 28, 1984

[54] TILTABLE ARC FURNACE

[75] Inventor: Karl Bühler, Nussbaumen, Switzerland

[73] Assignee: BBC Brown, Boveri & Company Limited, Baden, Switzerland

[21] Appl. No.: 309,482

[22] Filed: Oct. 7, 1981

[30] Foreign Application Priority Data

Oct. 9, 1980 [CH] Switzerland ............... 7540/80

[51] Int. Cl.³ .................. F27D 3/02; F27D 3/06; F27D 3/12
[52] U.S. Cl. .................................................. 373/84
[58] Field of Search ................ 373/84, 79; 266/240, 266/236

[56] References Cited

U.S. PATENT DOCUMENTS 980,345 1/1911 Ruthenburg ................ 373/84
1,420,561 6/1922 Leander ..................... 373/84
1,658,071 2/1928 Bernard ..................... 373/84

FOREIGN PATENT DOCUMENTS 437333 10/1935 United Kingdom ............ 373/79

Primary Examiner—Roy N. Envall, Jr.
Attorney, Agent, or Firm—Oblon, Fisher, Spivak, McClelland & Maier

[57] ABSTRACT

A tiltable arc furnace with a platform (5) supported on rolling-contact cradles (10) is designed so that the furnace shell (2) resting on a mobile carriage (6) can be moved approximately one furnace length on the platform (5) transversely to the pouring direction. The platform (5) is prolonged at one end and provided with appropriate travelling lines (8) comprising rails (9). As a result, a structure of unitary design is achieved, the tilting moments are limited to low values and expensive blocking and stopping systems can be omitted.

7 Claims, 5 Drawing Figures

TILTABLE ARC FURNACE

BACKGROUND OF THE INVENTION

The invention relates to a tiltable arc furnace, with a furnace shell located on a supporting construction and with a cover, the furnace being supported via a platform on rolling-contact cradles and the furnace shell being movable at least substantially at right angles to the tilting direction.

To feed an arc furnace with solid charging material, its shell must be made accessible. To achieve this purpose, it is unimportant for the charging operation whether the furnace cover including the furnace superstructure is removed from the furnace shell, which remains stationary, or whether the furnace shell is moved out of its original position away from the region of the cover. A very commonly used method is to pivot the furnace cover including the furnace superstructure away to the side. For this purpose, the cover-lifting and pivoting mechanism is designed as a revolving tower. Since the center of gravity of the furnace shifts when the cover is pivoted out, tilting moments which necessitate constructions of relatively large dimensions are exerted on the cradles of the furnace. Furthermore, the pivoting mechanism has to be locked for safety reasons.

The additional expenditure on the construction of the cover-pivoting device can be avoided by moving the shell out of the region of the cover.

If the shell is displaced in the tilting direction, high tilting moments again arise. The tilting moments can assume such high values, especially in the case of relatively large furnaces, that considerable outlay in terms of construction would be necessary to overcome them.

If, on the other hand, the shell is moved transversely to the tilting direction, the center of gravity of the shell shifts along the cradle axis, and the tilting moment remains low and can be overcome.

In the off-print "Evolution des Fours à arc type Héroult à chargement rapide" ["The development of Héroult-type rapid-charge arc furnaces"] by Brown, Bouveri & Cie., Baden, Switzerland, from "La Téchnique Moderne" of 15.3.1939, a furnace of the type mentioned above is described and illustrated. According to FIG. 6, of this publication, a roller-mounted furnace shell of an arc furnace is moved onto a concrete foundation from a platform provided with rolling-contact cradles, by means of a hydraulic device.

In this type of movement, however, the levels of the rail lines of the foundation and platform must coincide exactly. Because of different thermal expansions and effects of wear, especially at the rail joints, in the case of contamination by residual slag and/or splashes of iron, a smooth transition of the rail line from the foundation to the platform is often not guaranteed, so that jarring of the moving furnace shell is unavoidable. This can result in damage to the shell and to its refractory lining. Moreover, an expensive blocking or stopping system is necessary to prevent lateral displacement at the rail joints.

SUMMARY OF THE INVENTION

The invention is intended to remedy this. The invention achieves the object of providing a tiltable arc furnace, the furnace shell of which can be moved, in a simple and reliable way, out of the region of the furnace cover at right angles to the tilting direction.

The advantages obtained by means of the invention are to be seen essentially in the fact that the platform, which is prolonged, at least at one end, by approximately one furnace length and which is designed over its entire length as a tilting cradle, is designed as a unitary structure, and no high tilting moments can arise and expensive blocking and stopping systems can be omitted.

As further features of the invention the supporting construction of the furnace shell rests on a mobile carriage which is designed as a rolling mobile carriage and is movable on appropriate rails located on the platform.

Moreover the supporting construction of the furnace shell is provided with rails, and the platform has over its entire length appropriate rollers or wheels which, are designed as profiled wheels. This constructional solution is simple, and mass-produced rollers or wheels can be used. The supporting construction of the furnace shell may also be provided with sliding pieces and the platform provided with corresponding slide tracks, the slide tracks having a sliding layer, preferably nylon or Teflon (polytetrafluoroethylene). To remove the load on the slide tracks and sliding pieces hydrostatically, connections are provided for the supply of a pressure medium. The advantage of this alternative form is that no rotating parts have to be used, but, on the other hand, a high-pressure generation source for the pressure medium is necessary.

BRIEF DESCRIPTION OF THE DRAWINGS

The invention is explained in more detail below with reference to an exemplary embodiment illustrated in the drawing in which.

DETAILED DESCRIPTION OF THE PREFERRED EMBODIMENTS

Figure 1:
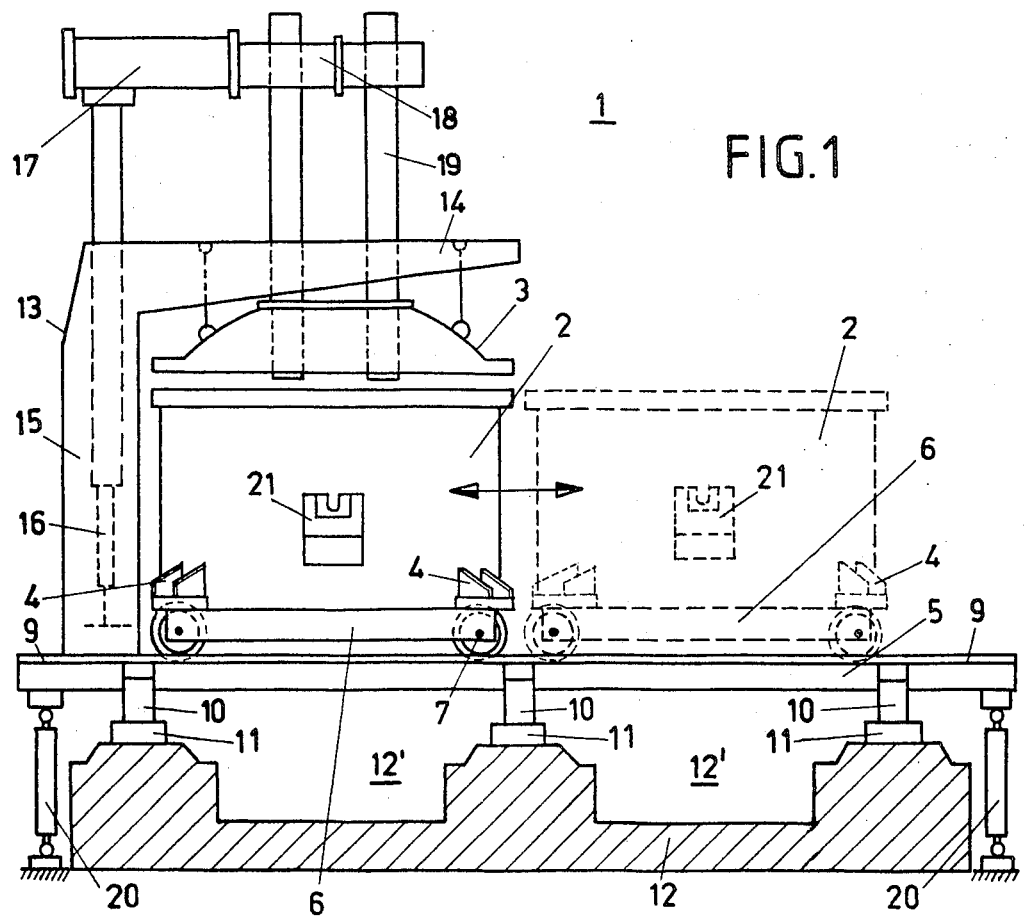
FIG. 1 shows a diagrammatic front view of an arc furnace, the furnace shell being in 2 positions.

According to FIG. 1, a furnace shell 2 is indicated in two positions.

The left-hand position indicated by unbroken lines is the working position for the smelting operation. The right-hand position indicated by broken lines is the position of the furnace shell 2 for the charging operation.

A cover 3 is illustrated in its raised position, so that it is free of the furnace shell 2 for the movement of the shell in the directions indicated by the double arrow.

The arc furnace 1 is shown only diagrammatically. The supporting construction 4 of the furnace shell 2 rests on a mobile carriage 6 which is supported on wheels 7 on the platform 5 and which thus constitutes a rolling mobile carriage.

In this example, the platform 5 is supported by means of three rolling-contact cradles 10 which can, in turn, roll on three cradle-beams 11.

The cradle-beams 11 are attached to a foundation 12. A supporting tower 13 is fixed to the platform 5 and supports both a cover-lifting device 14 and three electrode-adjusting columns 15. The electrode-adjusting columns 15 are connected vertically to associated electrode-adjusting cylinders 16 so as to be individually movable hydraulically. The electrode-adjusting columns 15 carry electrode-supporting arms 17, at the outer ends of which the electrodes 19 are held in electrode holders 18.

Four hydraulic cylinders 20, which are connected to the platform 5, one on the left and one on the right at each end of the latter, cause the tilting movements of the arc furnace 1 for pouring out the smelt and for removing slag from the smelt and, at the same time, secure the location of the platform 5 in the working position of the arc furnace 1. Depressions 12' are provided in the foundation 12 between the cradle-beams 11, so as to allow any large quantities of slag occurring to be accommodated and to prevent contact with the bottom part of the furnace shell 2. The pouring spout 21 is also to be seen in FIG. 1.

Most parts described with reference to FIG. 1 can also be seen in FIG. 2 which shows a diagrammatic plan view according to FIG. 1. In the other Figures, the functional parts are designated by the same reference numerals as in FIG. 1. The rails 9 fastened to the platform 5 as well as, in addition, the slag door 22 are to be seen in FIG. 2.

Figure 3:
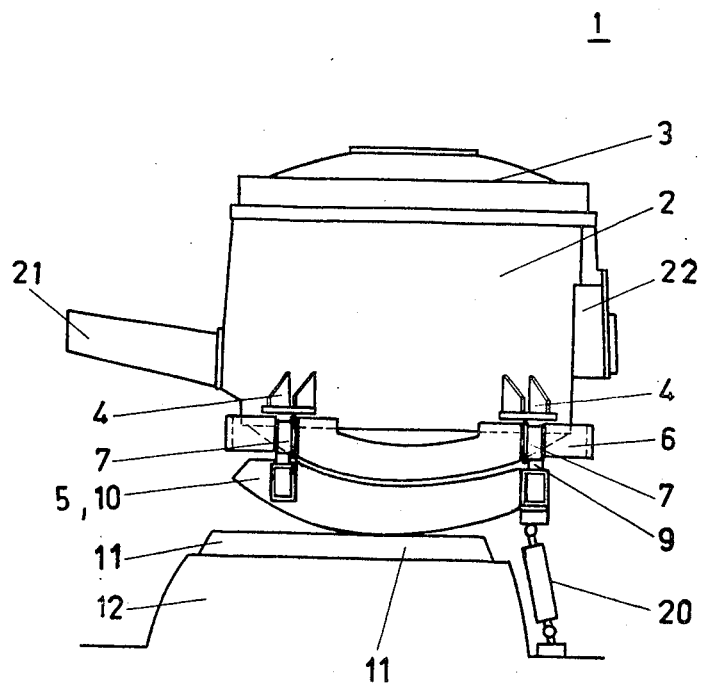
FIG. 3 shows a diagrammatic side view according to FIG. 1.
Figure 4:
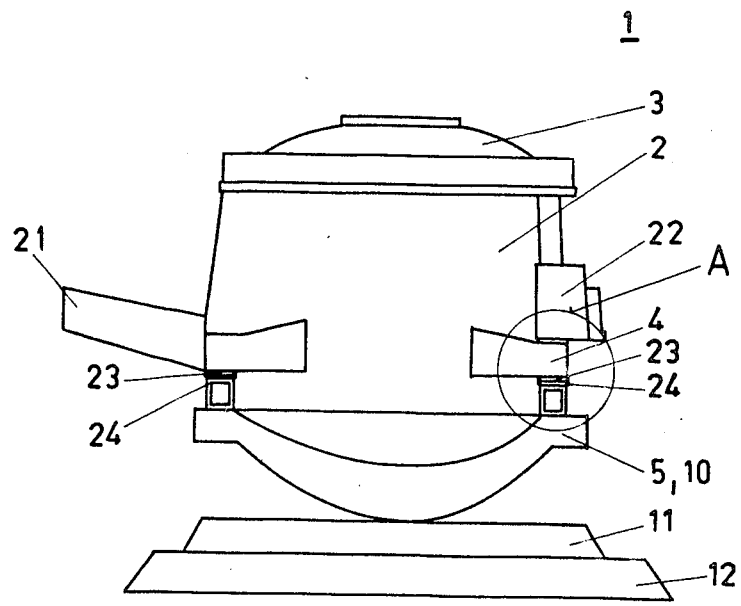
FIG. 4 shows a diagrammatic side view of an arc furnace which is equipped with sliding pieces and slide tracks.
Figure 5:
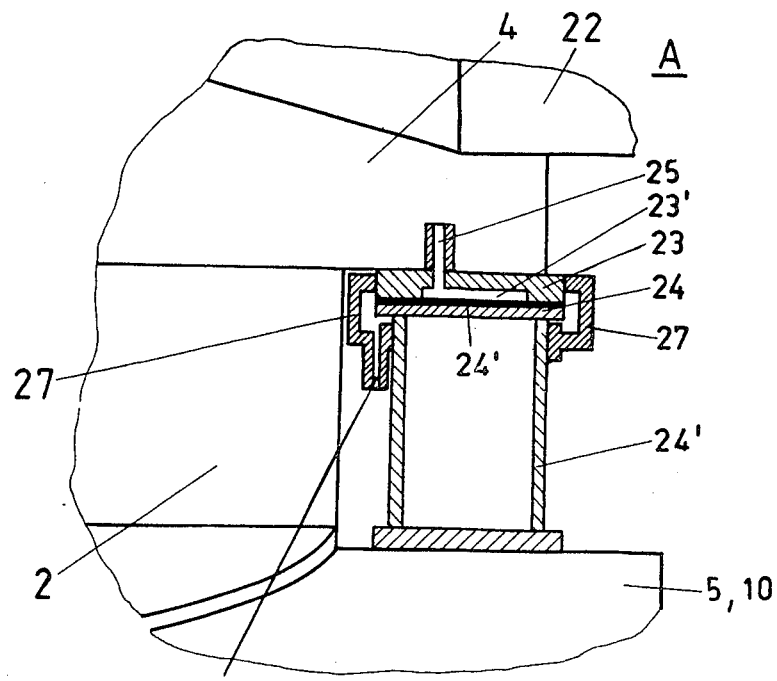
FIG. 5 shows an enlarged cross-section through the sliding mechanism according to FIG. 4.

In FIGS. 3 to 5, all the parts not needed for an immediate understanding of the invention have been omitted. They are emphasized expressly in the description of FIG. 1.

Figure 2:
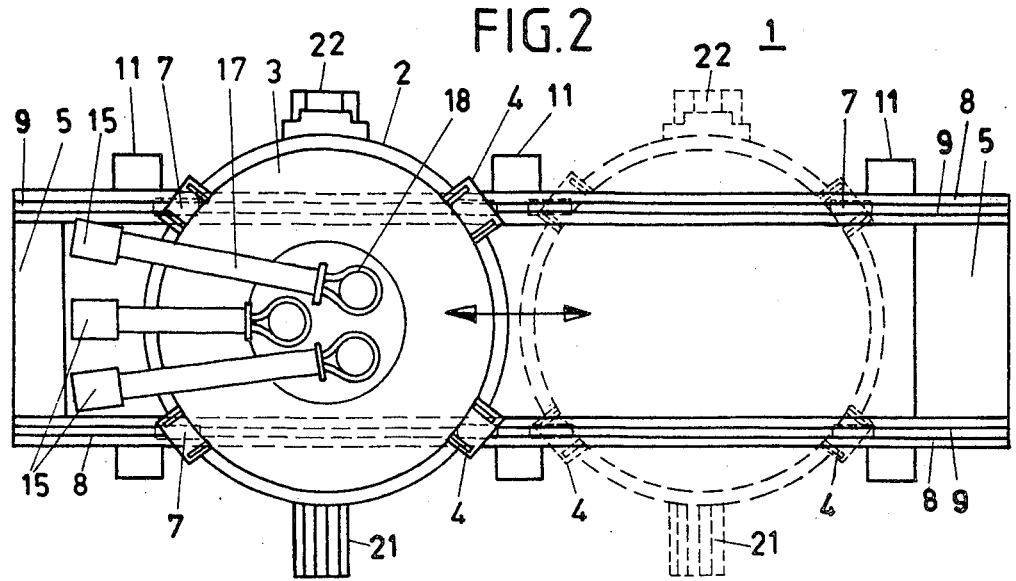
FIG. 2 shows a diagrammatic plan view according to FIG. 1.

FIG. 3 shows the side view of an arc furnace according to FIGS. 1 and 2. The furnace shell 2 is supported by means of the supporting construction 4 on the mobile carriage 6 which is designed, here, as a rolling mobile carriage and is provided with wheels 7. In the alternative, the mobile carriage could be equipped with rails and the platform could be provided with appropriate rollers or wheels along its entire length.

In FIG. 4, the furnace shell 2 is equipped, on the supporting construction 4, with sliding pieces 23, so that the furnace shell 2 is movable transversely to the tilting direction on slide tracks 24.

The sliding pieces 23 and the slide tracks 24 are shown in detail in FIG. 5.

The slide track 24 is provided with a sliding layer 24'. The contact face of the sliding pieces 23, which is interrupted in the middle portion by a cavity 23', presses with its remaining part against the contact faces of the sliding layer 24' of the slide track 24.

A high-pressure generation source (not shown) is connected to the cavity of the sliding pieces 23'.

Water is expediently used as the pressure medium. Sliding-piece guides 27 are attached outside the slide track and serve, at the same time, as collecting vessels 27 for the outflowing pressure medium and are provided with a drain 26 for the pressure medium.

The arc-furnace shell 2 is moved by means of the sliding pieces 23 and slide tracks 24 as follows:

In the state of rest, no excess pressure is generated in a high-pressure generation source, not shown in detail, so that the contact faces of the sliding pieces 23 can bear fully on the sliding layer 24' of the slide tracks 24, and a high coefficient of friction is therefore present. If the furnace shell 2 is now to be moved into the charging position, the pressure in the pressure-medium source is increased continuously or in steps, and the pressure medium is forced out of the cavity in the sliding pieces between the contact faces of the sliding pieces 23 and the sliding layer 24' of the slide tracks 24 and forms a sliding film which reduces the coefficient of friction substantially, and a movement can thus be carried out with a low expenditure of force. During this time, part of the pressure medium flows off into the collecting vessel 27 for the pressure medium, which is attached laterally over the entire length of the slide tracks 24, and finally enters the drain 26 for the pressure medium, where it is then pumped back to the starting point of the pressure-medium circulation system.

When the desired position of movement of the furnace shell 2 is reached, the generation of pressure in the pressure-medium source is cancelled, the sliding film between the contact faces is pressed out, the coefficient of friction increases and a stable position is thus provided.

The actual movement can be carried out by means of conventional drive mechanisms, for example a cable-pull.

I claim:

1. A tiltable arc furnace comprising:
   a furnace shell having a width;
   a cover positionable on said furnace shell;
   a platform having a length of at least two said furnace widths in a first direction, said platform being pivotally supported on a foundation along said entire length by at least three rolling contact cradles, said cradles being constructed and oriented to roll on three cradle-beams disposed one at each end of said platform and one intermediate said ends of said platform, thereby to provide pivoting of said platform in a second direction at right angles to said first direction; and
   means for supporting said shell on said platform for movement in said first direction, said means for supporting comprising travelling lines mounted on said platform and extending uninterrupted in said first direction along the entire length of said platform, said means for supporting further comprising means fixed to said shell and movable along said travelling lines,
   whereby pivoting of said platform tilts said shell in said second direction.

2. The furnace of claim 1 wherein said means fixed to said shell comprises a mobile carriage having wheels and wherein said travelling lines comprise rails.

3. The furnace of claim 1 wherein said means fixed to said shell comprises a mobile carriage having rails and wherein said travelling lines comprise arrays of wheels extending over the entire length of said platform.

4. The furnace of claims 2 or 3 wherein said wheels have profiled peripheries for fixing said shell relative to said platform in said second direction.

5. The furnace of claim 1 wherein:
   said means fixed to said shell comprise sliding pieces; and
   said travelling lines comprise slide tracks mounted on said platform and extending uninterrupted in said first direction along the entire length of said platform, said sliding pieces being slidaby movable on said slide tracks.

6. The furnace of claim 5 including a sliding layer formed of low friction material positioned between each of said sliding pieces and said slide tracks.

7. The furnace of claim 5 including means for hydrostatically separating said sliding pieces and said sliding tracks.

* * * * *